(12) United States Patent
Cox (10) Patent No.: US 10,053,207 B2
(45) Date of Patent: Aug. 21, 2018

(54) DE-ROTATION SYSTEM FOR A SHAFT FAIRING

(71) Applicant: Sikorsky Aircraft Corporation, Stratford, CT (US)

(72) Inventor: John C. Cox, Aledo, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 117 days.

(21) Appl. No.: 15/105,255

(22) PCT Filed: Dec. 19, 2013

(86) PCT No.: PCT/US2013/076511
§ 371 (c)(1),
(2) Date: Jun. 16, 2016

(87) PCT Pub. No.: WO2015/094275
PCT Pub. Date: Jun. 25, 2015

(65) Prior Publication Data
US 2017/0021912 A1    Jan. 26, 2017

(51) Int. Cl.
*B64C 7/00* (2006.01)
*B64C 27/04* (2006.01)
(Continued)

(52) U.S. Cl.
CPC ............... *B64C 7/00* (2013.01); *B64C 27/04* (2013.01); *B64C 27/10* (2013.01); *B64C 27/59* (2013.01); *B64C 2027/125* (2013.01)

(58) Field of Classification Search
CPC .......... B64C 7/00; B64C 27/10; B64C 27/59; B64C 2027/125
See application file for complete search history.

(56) References Cited

U.S. PATENT DOCUMENTS

| 5,782,433 A | 7/1998 | Goi et al. |
| 6,042,499 A | 3/2000 | Goi et al. |

(Continued)

FOREIGN PATENT DOCUMENTS

| GB | 2447641 A | 9/2008 |
| JP | H11342899 A | 12/1999 |

OTHER PUBLICATIONS

Notification of Transmittal of the International Search Report and the Written Opinion of the International Searching Authority, of the Declaration for International Application No. PCT/US2013/076511 dated Apr. 14, 2014; Mailed May 6, 2014; 10 pages.

(Continued)

*Primary Examiner* — Christopher P Ellis
(74) *Attorney, Agent, or Firm* — Cantor Colburn LLP (57) ABSTRACT

A fairing system for a rotary wing aircraft is provided including a shaft fairing mounted for rotation about a first axis of rotation. A de-rotation system contained with the shaft fairing includes a toroidal continuously variable transmission configured to control the rotation of the shaft fairing about the first axis of rotation. A position control system includes at least one position sensor and a controller. The at least one position sensor is configured to monitor a position of the shaft fairing relative to the first axis of rotation. The controller is operably coupled to the at least one position sensor and the de-rotation system. The controller is configured to adjust a gear ratio of the toroidal continuously variable transmission in response to a sensed position of the shaft fairing.

19 Claims, 9 Drawing Sheets

(51) Int. Cl.
  *B64C 27/10* (2006.01)
  *B64C 27/59* (2006.01)
  *B64C 27/12* (2006.01)

(56) References Cited

U.S. PATENT DOCUMENTS

| | | | |
|---|---|---|---|
| 6,053,452 A | | 4/2000 | Yamakawa et al. |
| 6,254,504 B1 | | 7/2001 | Goi et al. |
| 6,871,128 B2 | | 3/2005 | Kouno et al. |
| 7,607,607 B2 | | 10/2009 | Darrow, Jr. et al. |
| 7,621,480 B2 | | 11/2009 | Darrow, Jr. et al. |
| 8,534,596 B2 | | 9/2013 | Lauder |
| 2006/0269411 A1 | * | 11/2006 | Bertolotti .............. B64C 1/00 416/134 A |
| 2007/0181741 A1 | * | 8/2007 | Darrow, Jr. ............ B64C 1/00 244/17.23 |
| 2009/0084891 A1 | * | 4/2009 | Darrow, Jr. ............ B64C 7/00 244/17.19 |
| 2010/0264258 A1 | * | 10/2010 | Sirohi .................. B64C 27/10 244/17.27 |
| 2010/0266411 A1 | * | 10/2010 | Stamps ............... B64C 29/0033 416/131 |
| 2010/0270423 A1 | * | 10/2010 | Lauder .................. B64C 1/00 244/17.19 |
| 2014/0030103 A1 | * | 1/2014 | Matalanis ............. B64C 7/00 416/223 R |
| 2017/0096212 A1 | * | 4/2017 | Florea .................. B64C 7/00 |
| 2017/0113790 A1 | * | 4/2017 | Bazzani ............... B64C 27/10 |
| 2017/0225772 A1 | * | 8/2017 | Min ...................... B64C 21/04 |
| 2017/0283046 A1 | * | 10/2017 | Egolf ................... B64C 27/10 |

OTHER PUBLICATIONS

EP Communication; Extended European Search Report; Application No. 13899502.2-1754/3083397 PCT/US2013076511; dated Jul. 3, 2017, pp. 1-5.
PCT International Preliminary Report on Patentability; International Application No. PCT/US2013/076511; International Filing Date: Dec. 19, 2013, dated Jun. 21, 2016, pp. 1-5.

* cited by examiner

DE-ROTATION SYSTEM FOR A SHAFT FAIRING

BACKGROUND OF THE INVENTION

Exemplary embodiments of the invention generally relate to a rotary wing aircraft, and more particularly, to a de-rotation system for limiting rotation of a shaft fairing of the rotary wing aircraft.

The aerodynamic drag associated with a rotor hub of a rotary wing aircraft is a significant portion of the overall aircraft drag, typically 25 percent to 30 percent for conventional single-rotor helicopters. The rotor system drag increases for a rotary wing aircraft having a counter-rotating, coaxial rotor system primarily due to the dual rotor hubs and the interconnecting main rotor shaft assembly. For high-speed rotary wing aircraft, the increased drag resulting from the counter-rotating, coaxial rotor system may result in a relatively significant power penalty.

The aerodynamic drag of the dual counter-rotating, coaxial rotor system is generated by three main components—the upper rotor hub assembly, the lower rotor hub assembly, and the interconnecting main rotor shaft assembly. The drag contribution may be approximately 40 percent for each of the hubs, and 20 percent for the interconnecting main rotor shaft assembly. Typically, a rotor hub fairing arrangement is mounted to each of the upper rotor hub and the lower rotor hub such that overall drag on the rotorcraft is reduced. The interconnecting main rotor shaft between the upper rotor hub assembly and the lower rotor hub assembly, however, is typically exposed.

BRIEF DESCRIPTION OF THE INVENTION

According to one embodiment of the invention, a fairing system for a rotary wing aircraft is provided including a shaft fairing mounted for rotation about a first axis of rotation. A de-rotation system contained with the shaft fairing includes a toroidal continuously variable transmission configured to control the rotation of the shaft fairing about the first axis of rotation. A position control system includes at least one position sensor and a controller. The at least one position sensor is configured to monitor a position of the shaft fairing relative to the first axis of rotation. The controller is operably coupled to the at least one position sensor and the de-rotation system. The controller is configured to adjust a gear ratio of the toroidal continuously variable transmission in response to a sensed position of the shaft fairing.

Alternatively, in this or other aspects of the invention the de-rotation system further comprises a cage configured to mount to a shaft via one or more bearings. The cage is also configured to mount to the shaft fairing. A first platform and a second platform are spaced apart by a distance and extend generally outwardly from a surface of the cage. A first opening is formed in the cage generally adjacent the first platform. A second opening is formed in the cage generally adjacent the second platform. The toroidal CVT is mounted to the first platform and second platform.

Alternatively, in this or other aspects of the invention, the toroidal CVT further comprises and upper drive system and a lower drive system. The upper drive system is mounted to the first platform and includes a first drive pulley, at least one first idler pulley, and a first belt arranged in a continuous loop about the first drive pulley and the first idler pulley. A portion of the first belt is arranged within the first opening and is configured to contact an adjacent first sprocket rotating in a first direction. The lower drive system is mounted to the second platform and includes a second drive pulley, at least one second idler pulley, and a second belt arranged in a continuous loop about the second drive pulley and the second idler pulley. A portion of the second belt is arranged within the second opening and is configured to contact an adjacent second sprocket rotating in a second direction. An upper cone disc is operably coupled to the first pulley and a lower cone disc is operably coupled to the second drive pulley. The upper cone disc and the lower cone disc are arranged about a common second axis of rotation. A pair of power rollers is arranged on opposing side of, and in contact with, the upper cone disc and the lower cone disc. The power rollers are configured to rotate between a balanced position and a rotated position to alter a gear ratio between the upper cone disc and the lower cone disc. At least one actuator is operably coupled to each of the power rollers to adjust the position of the power rollers.

Alternatively, in this or other aspects of the invention, the gear ratio of the toroidal CVT is 1:1 when the power rollers are arranged in the balanced position.

Alternatively, in this or other aspects of the invention, when the gear ration of the toroidal CVT is 1:1, the de-rotation system does not rotate the shaft fairing relative to the first axis of rotation.

Alternatively, in this or other aspects of the invention, when the power rollers are arranged in a rotated position, the de-rotation system is configured to rotate about the first axis of rotation.

Alternatively, in this or other aspects of the invention, the controller is configured to activate the at least one actuator to adjust the gear ration of the power rollers.

According to another embodiment of the invention, a rotary wing aircraft is provided including a lower rotor system and an upper rotor system. The lower rotor system includes a lower shaft connected to a lower rotor hub. The upper rotor system includes an upper shaft connected to an upper rotor hub. The lower shaft is configured to rotate about a first axis of rotation in a first direction and the upper shaft is configured to rotate about the first axis of rotation in a second direction. A shaft fairing is mounted between the upper rotor hub and the lower rotor hub for rotation about the first axis of rotation. A de-rotation system contained with the shaft fairing includes a toroidal continuously variable transmission configured to control the rotation of the shaft fairing about the first axis of rotation. A position control system includes at least one position sensor and a controller. The at least one position sensor is configured to monitor a position of the shaft fairing relative to the first axis of rotation. The controller is operably coupled to the at least one position sensor and the de-rotation system. The controller is configured to adjust a gear ratio of the toroidal continuously variable transmission in response to a sensed position of the shaft fairing.

Alternatively, in this or other aspects of the invention, a cage is configured to mount to one of the upper and lower shafts. A first platform and a second platform, spaced apart by a distance, extend outwardly from a surface of the cage. A first opening is formed in the cage between the first platform and a first end of the cage to expose one of the upper and lower shafts. A second opening is formed in the cage between the second platform and a second end of the cage to expose the other of the upper and lower shafts. The toroidal CVT is mounted to the first platform and the second platform.

Alternatively, in this or other aspects of the invention, an upper drive system is mounted to the first platform and a lower drive system is mounted to the second platform. The upper drive system includes a first drive pulley, at least one first idler pulley, and a first belt arranged in a continuous loop about the first drive pulley and at least one first idler pulley. A portion of the first belt, arranged within the first opening, is configured to engage the first sprocket. The lower drive system includes a second drive pulley, at least one second idler pulley, and a second belt arranged in a continuous loop about the second drive pulley and at least one second idler pulley. A portion of the second belt, arranged within the second opening, is configured to engage the second sprocket. An upper cone disc is operably coupled to the first drive pulley and a lower cone disc is operably coupled to the second drive puller. The upper and lower cone discs are arranged about a common second axis of rotation. A pair of power roller is arranged on opposing sider of and in contact with the upper cone disc and the lower cone disc. The power rollers are configured to rotate between a balanced position and a rotated position to alter a gear ration between the upper cone disc and the lower cone disc. At least one actuator is operably coupled to each of the power rollers to adjust the position of the power rollers.

Alternatively, in this or other aspects of the invention, the gear ratio of the toroidal CVT is 1:1 when the power rollers are arranged in the balanced position.

Alternatively, in this or other aspects of the invention, when the gear ration of the toroidal CVT is 1:1, the de-rotation system does not rotate the shaft fairing relative to the first axis of rotation.

Alternatively, in this or other aspects of the invention, when the power rollers are arranged in a rotated position, the de-rotation system is configured to rotate about the first axis of rotation.

Alternatively, in this or other aspects of the invention, the controller is configured to activate the at least one actuator to adjust the gear ration of the power rollers.

According to yet another embodiment of the invention, a method of controlling rotation of a shaft fairing about a first axis of rotation is provided including monitoring a position of the shaft fairing. The position of the shaft fairing is compared to a desired position. If the position of the shaft fairing is different from the desired position, the gear ratio of the de-rotation system including a toroidal continuously variable transmission is adjusted. The shaft fairing is rotated towards the desired position. The gear ratio of the de-rotation system is adjusted once the shaft fairing reaches the desired position.

Alternatively, in this or other aspects of the invention, the position of the shaft fairing is monitored using at least one position sensor operably coupled to a controller.

Alternatively, in this or other aspects of the invention, the controller is operably coupled to at least one actuator of the de-rotation system. The controller is configured to operate the actuator to adjust the gear ratio.

Alternatively, in this or other aspects of the invention, once the shaft fairing reaches the desired position, the gear ratio is adjusted to 1:1.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
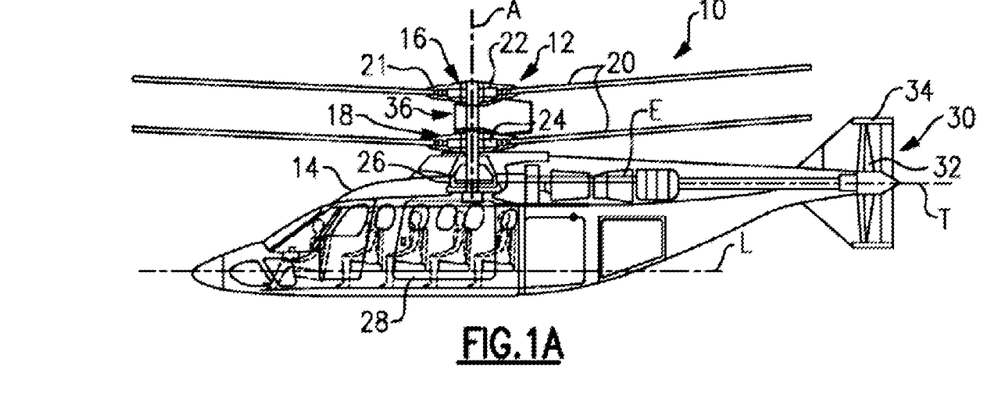
FIG. 1A is a schematic view of an example of a rotary wing aircraft.

FIG. 1A illustrates an exemplary vertical takeoff and landing (VTOL) aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in this non-limiting embodiment, other counter-rotating, coaxial rotor systems will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24, respectively. Any number of rotor blades 20 may be used with the rotor system 12.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). The gearbox 26 may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. The translational thrust system 30 includes a pusher propeller 32 mounted within an aerodynamic cowling 34. Although a tail mounted translational thrust system 30 is disclosed in this illustrated non-limiting embodiment, it should be understood that any such system or other translational thrust systems, including tractor and pod mounted systems, or external jet engines, may alternatively or additionally be utilized.

The rotor system 12 includes a rotor hub fairing system 36 generally located between and around the upper and lower rotor systems 16, 18 such that the rotor hubs 22, 24 are at least partially contained therein. The rotor hub fairing system 36 provides significant drag reduction in which large-scale flow separation is greatly reduced.

Figure 1B:
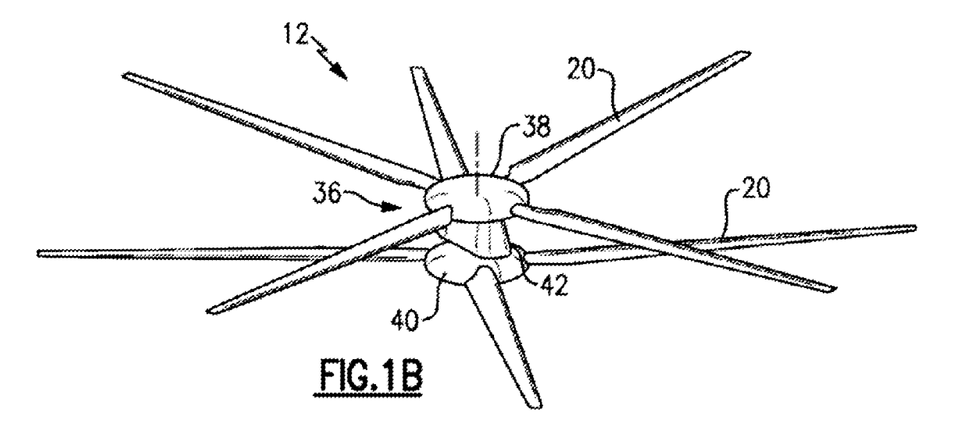
FIG. 1B is a perspective view of a counter-rotating coaxial rotor system mounting a rotor hub fairing system.

The rotor hub fairing system 36 generally includes an upper hub fairing 38, a lower hub fairing 40 and a shaft fairing 42 there between (also illustrated in FIG. 1B). The rotor hub fairing system 36 is integrated such that the shaft fairing 42 generally follows the contours of the upper hub fairing 38 and the lower hub fairing 40 at the rotational interfaces there between to reduce interference effects between the separate fairing 38, 40, 42 and minimize flow separation in the junction areas. Furthermore, the lower hub fairing 40 is integrated with the airframe 14 in an area typically referred to on a rotorcraft as a pylon 14D (see FIG. 1C). It should be understood that fairing systems of various configurations will be usable with the exemplary embodiments of the present invention presented herein.

Figure 1C:
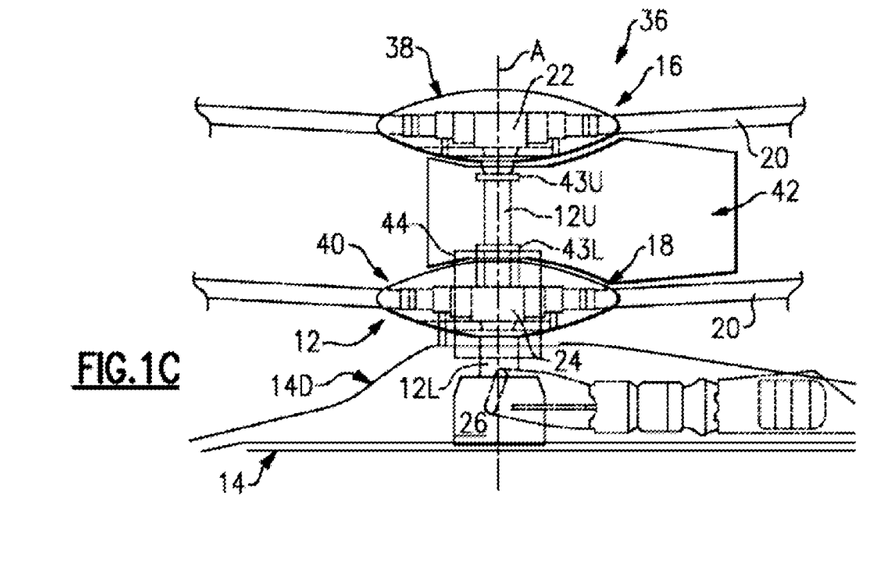
FIG. 1C is an expanded partial phantom view of a counter-rotating coaxial rotor system mounting a rotor hub fairing system.
Figure 2:
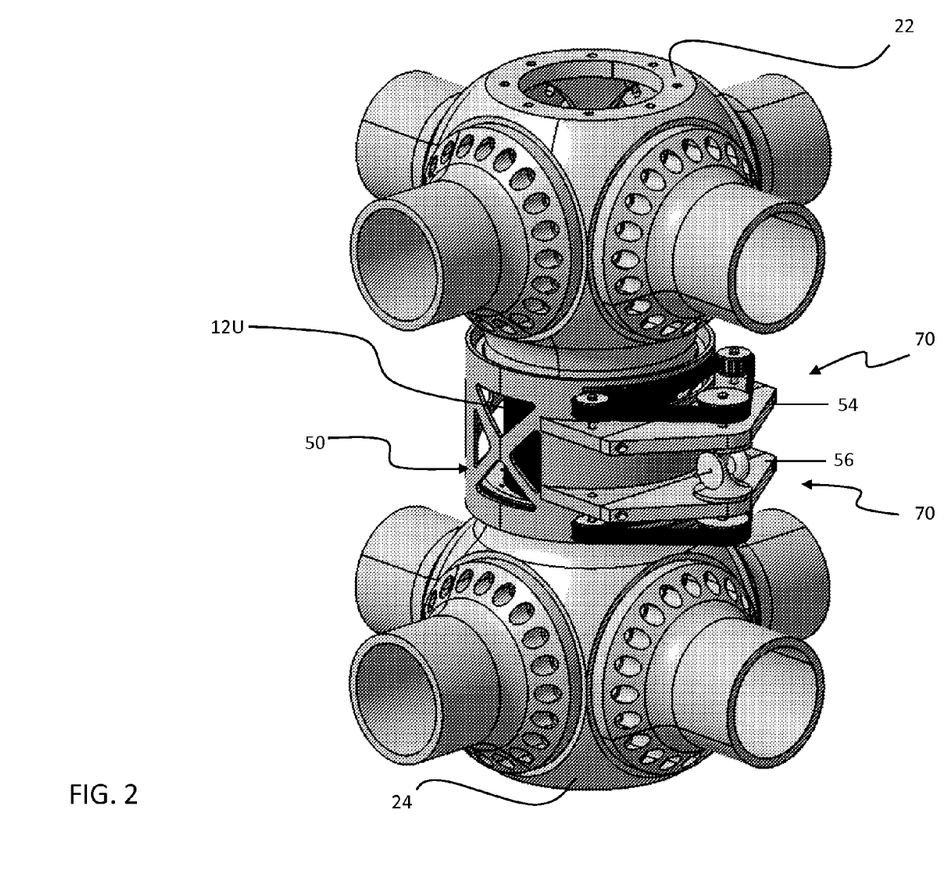
FIG. 2 is a perspective view of a counter-rotating coaxial rotor system including a de-rotation system contained within a shaft fairing according to an embodiment of the invention.
Figure 3:
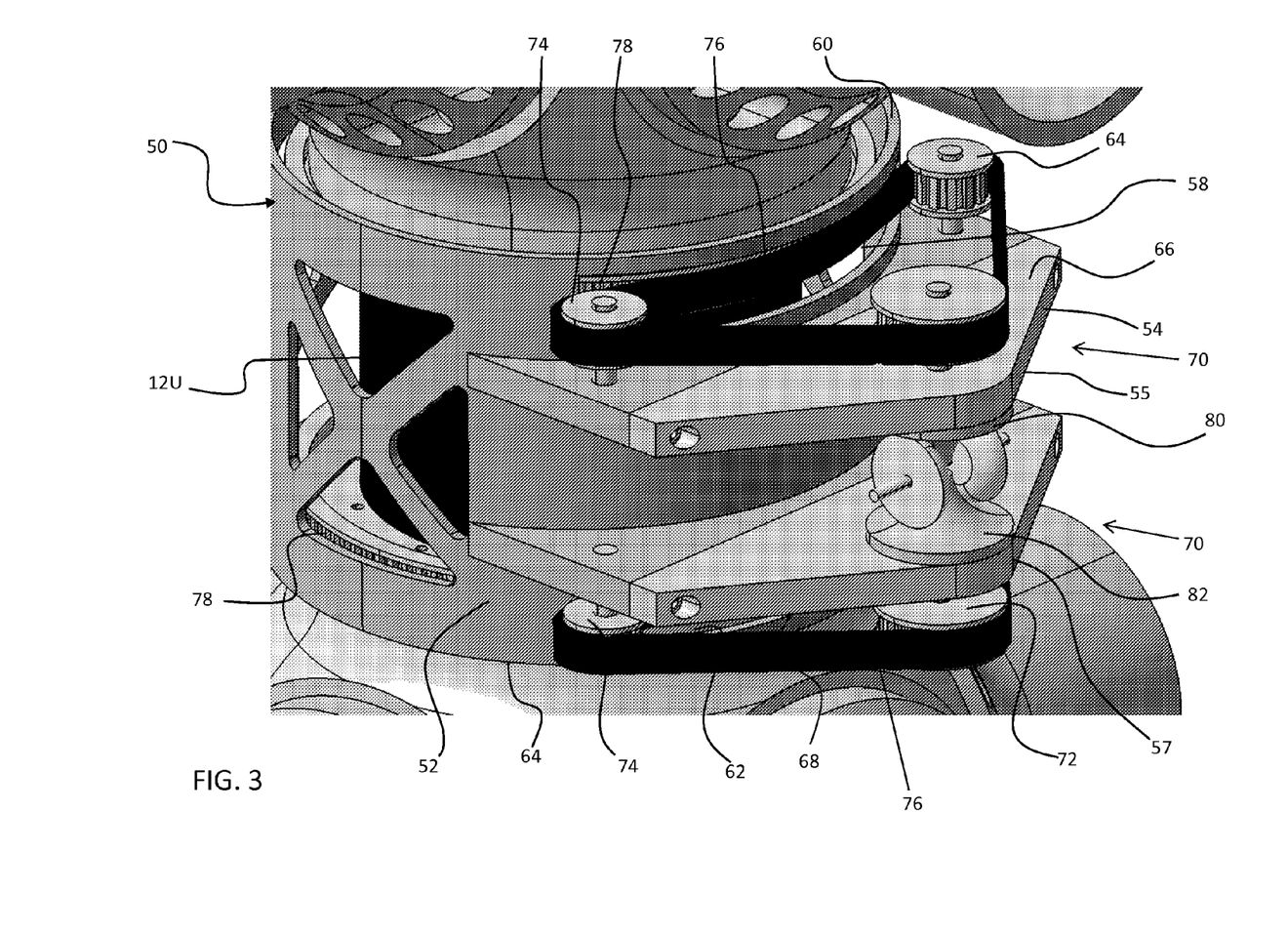
FIG. 3 is a perspective view of a portion of the de-rotation system including power rollers arranged in a neutral position according to an embodiment of the invention.

Referring to FIG. 1C, the shaft fairing 42 may be mounted to the counter-rotating, coaxial rotor system 12 through a bearing arrangement 43U, 43L (illustrated schematically) such that the shaft fairing 42 may be positioned at a relative angular position about the axis of rotation A relative the airframe 14 by a de-rotation system 44. The upper bearing arrangement 43U and the lower bearing 43L may be respectively located adjacent an upper portion and a lower portion of the shaft fairing 42. The upper bearing arrangement 43U may be attached to one rotor shaft 12U while the lower bearing arrangement 43L may be attached to the other rotor shaft 12L such that bearings in the arrangements 43U, 43L are counter rotating and the net bearing drag is relatively low.

The de-rotation system 44 contained within the shaft fairing 42 controls the position of the shaft fairing 42 about the axis of rotation A such that the shaft fairing 42 is prevented from rotating freely in unison with either shaft 12U, 12L as may otherwise result during some flight regimes. Although exemplary embodiments of the present invention are described in connection with a particular non-limiting aircraft embodiment, it should be readily appreciated that other systems which require a stationary fairing in a rotational environment will also benefit herefrom. While shown as empty other than covering the de-rotation system 44, it is understood that the shaft fairing 42 could house electronic or other elements used by the aircraft. Further, while shown as an airfoil shape, it is understood that the fairing 42 could have other shapes, including angular shapes.

Figure 4:
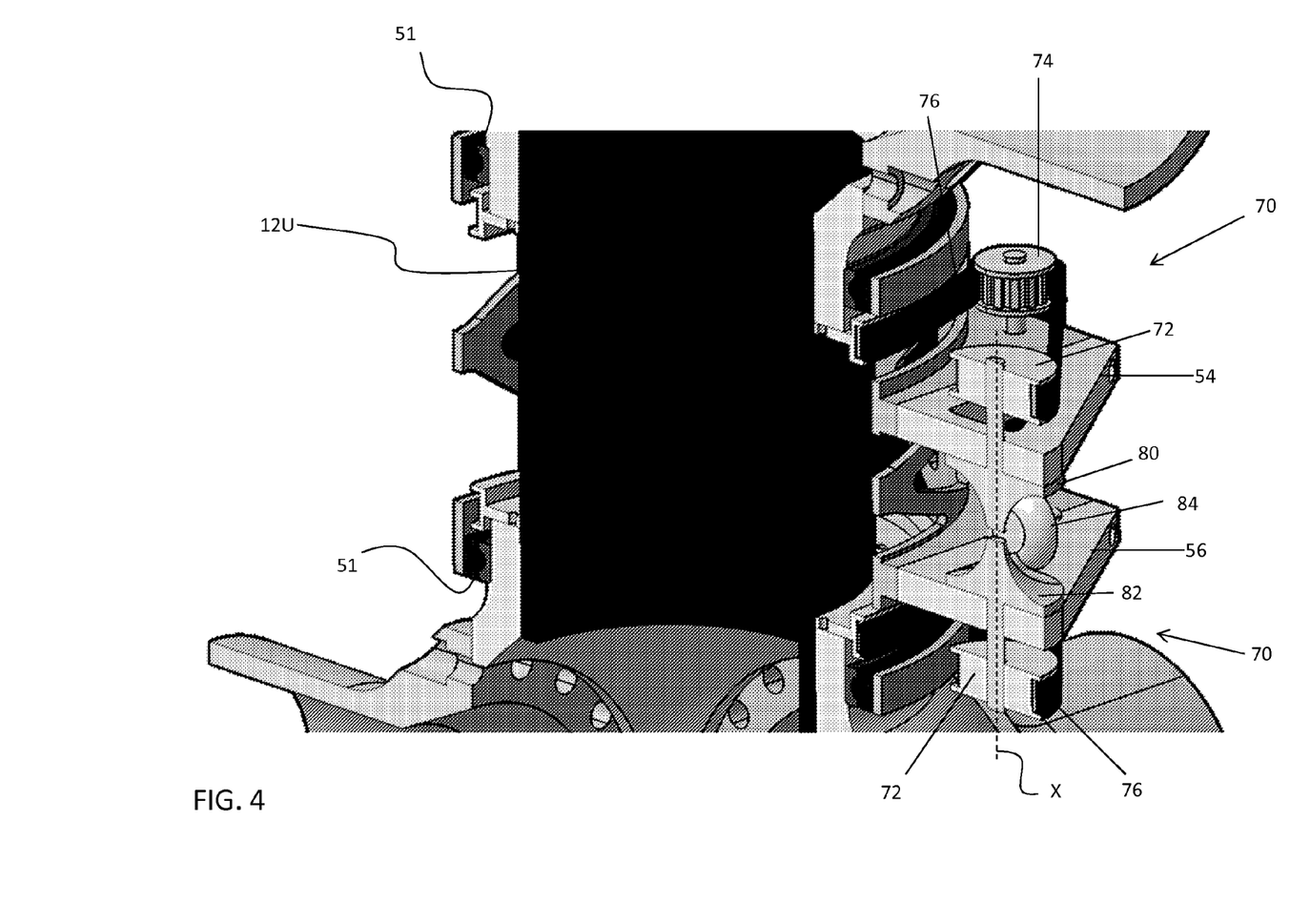
FIG. 4 is a cross-sectional view of the portion of the de-rotation system illustrated in FIG. 3 according to an embodiment of the invention.
Figure 5:
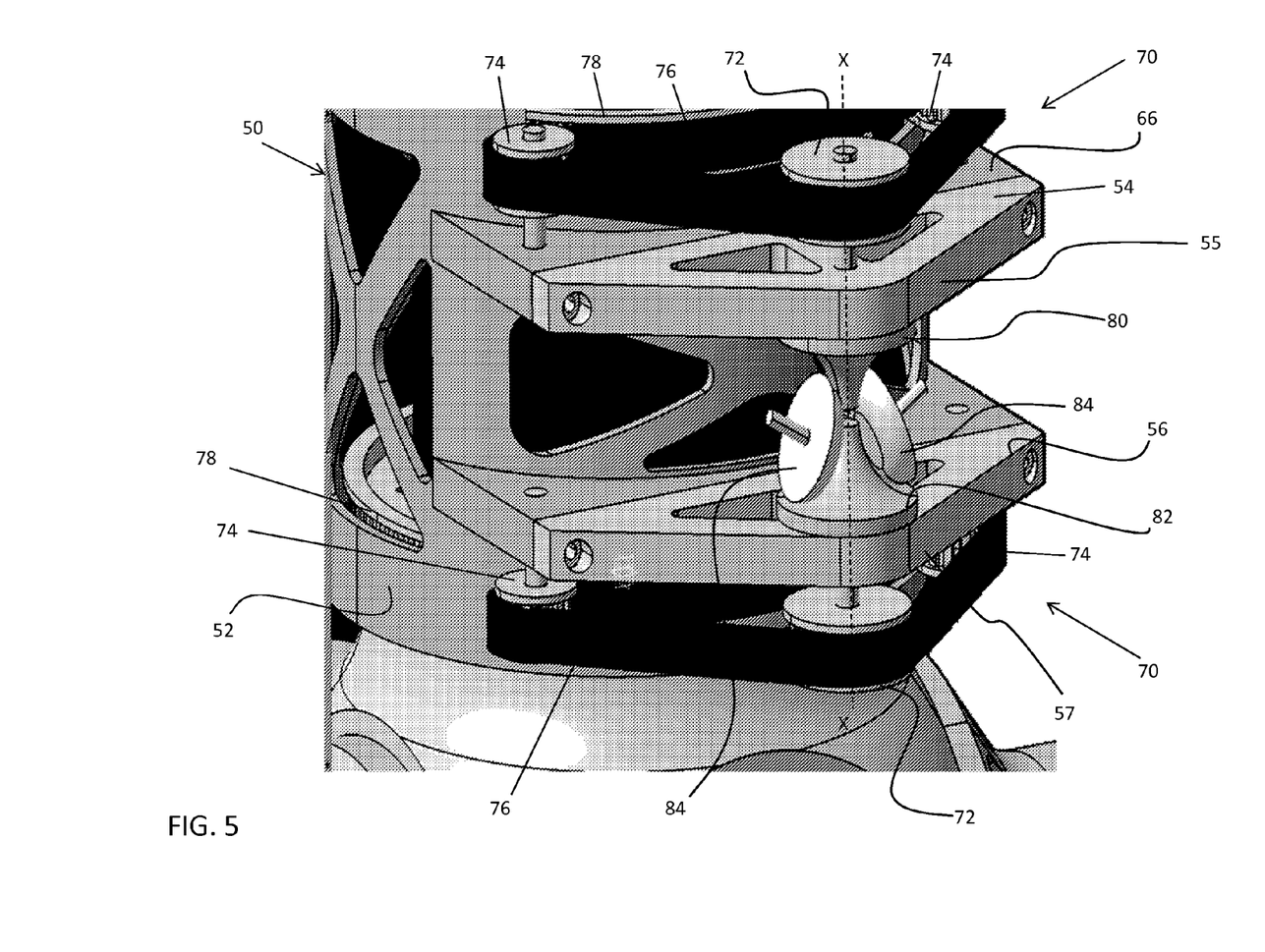
FIG. 5 is a perspective view of a portion of the de-rotation system including power rollers arranged in an offset position according to an embodiment of the invention.

Referring now to FIGS. 2-5, the de-rotation system 44 includes a toroidal continuously variable transmission (CVT) configured to at least partially nullify the rotation of the shaft fairing 42 which may otherwise occur due to parasitic friction of the bearing arrangement 43U, 43L. The de-rotation system 44 includes a cage 50 mounted concentrically about the upper shaft 12U, between the upper rotor hub 22 and the lower rotor hub 24 with at least one bearing 51 (FIG. 4). Extending outwardly from the surface 52 of the cage 50 is a first platform 54 and a substantially identical, second platform 56, spaced apart by a distance. A first rectangular opening 58 is formed in the portion of the cage 50 between the first platform 54 and an upper edge 60 so as to expose the upper shaft 12U. Similarly a second rectangular opening (not shown) is formed in the portion of the cage 50 between the second platform 56 and a lower edge 64 to expose the lower shaft 12L.

A drive system 70 of the CVT includes a drive pulley 72, at least one idler pulley 74, and a belt or chain 76 arranged in a continuous loop around each of the pulleys 72, 74. In the illustrated, non-limiting embodiment, the de-rotation system 44 includes an upper drive system 70 mounted to a surface 66 of the first platform 54 a lower drive system 70 mounted to a surface 68 of the second platform 56. The drive pulley 72 of each drive system 70 is positioned centrally near the free ends 55, 57 of the platforms 54, 56, respectively. Also, a first and second idler pulley 74 are arranged at opposite ends of the first and second rectangular opening 58, (not shown) adjacent the cage 50. The position of the idler pulleys 74 may be selected to maximize the portion of the belt 76 arranged within each of the rectangular openings. The belt 76 of the upper drive system 70 is configured to engage a toothed sprocket or chain pulley 78 mounted to the upper rotor shaft 12U through the first rectangular opening 58 and the belt 76 of the lower drive system 70 is configured to engage a toothed sprocket 78 mounted to the lower rotor shaft 12L through the second rectangular opening (not shown). Alternatively, the belts 76 of the upper and lower drive system 70 may extend through an opening in the cage 50 to contact a backside of the toothed sprockets 78 mounted to the upper and lower rotor shafts 12U, 12L. While described as having teeth, it is understood that sprockets 78 can have other frictional mechanisms use to drive the belt 76 and/or that the sprockets 78 can be integrated into one or both of the shafts 12U, 12L such that belts 76 are in direct contact with the shafts 12I and/or 12L.

An upper cone disc 80 and a lower cone disc 82 are mounted opposite one another in the space between the first platform 54 and the second platform 56. The upper cone disc 80 and the lower cone disc 82 are operably coupled to the drive pulleys 72 of the upper and lower drive systems 70, respectively. Rotation of the upper rotor shaft 12U is imparted to the upper cone disc 80 via the upper drive system 70. Similarly, rotation of the lower cone disc 82 is driven by the engagement between the lower drive system 70 and the rotating lower rotor shaft 12L. The upper cone disc 80 and the lower cone disc 82 are arranged on a common axis of rotation X and will rotate in opposite directions due to the contra-rotation of the shafts 12U, 12L.

A pair of power rollers 84 is operatively interposed between the upper and lower cone discs 80, 82 and is configured to transmit power between the upper cone disc 80 and the lower cone disc 82. The power rollers 84 are arranged to generally face one another with axis X, disposed there between. The upper and lower cone discs 80, 82 and the two power rollers 84 constitute a toroidal power transmission unit. Each of the power rollers 84 is supported by a trunnion 86. In one embodiment, a power roller bearing 88 is arranged between each power roller 84 and each trunnion 86 so that the power rollers 84 are rotatably supported by the trunnions 86. Each trunnion 86 is configured to pivot about an axis Y, between a balanced position (FIG. 3), and an offset position (FIG. 4). When the trunnions 86, and therefore the power rollers 84, are arranged in the balanced position, the gear ratio between the upper cone disc 80 and the lower cone disc 82 is 1:1. The axis Y is perpendicular to the axis X shown in FIG. 5 as shown, although it is understood that the axis Y need not be perpendicular in all aspects.

A shaft 89 extending along axis Y connects each trunnion 86 to a respective actuator 90. In the illustrated, non-limiting embodiment, the actuator 90 includes a piston 92 housed within a cylinder body 94. Movement of the piston 92 within the cylinder body 94 induces a pivotal movement of the trunnion 86 coupled thereto. A control valve, illustrated schematically at 96, is configured to vary the pressure difference between a high side 94a and a low side 94b of the cylinder body 94, thereby displacing the piston 92. In one embodiment, the control valve 96 is configured to activate the actuators 90 in response to a gear ratio command, such as from a controller of a position control system 100 (FIG. 6) for example. The actuator 90 pivots the corresponding shaft 89 of a trunnion 86 between the balanced position and an offset position. Each power roller 84 pivots about the pivot axis Y, while receiving a component force from the upper and lower cone discs 80, 82 so that the rotational speed of the lower cone disc 82 is continuously varied relative to the upper cone disc 80.

As the power rollers 84 rotate, the power rollers 84 contact the upper and lower cone discs 80, 82 at various positions having distinct diameters, resulting in a gear ratio other than 1:1 and therefore impart a controlled rotation into the fairing 42 attached to the cage 50 in either direction about the axis A. When returned to the gear ratio of 1:1, the rotation position is maintained at a given orientation, thereby maintaining the fairing 42 in a given heading. Although the embodiment illustrated and described herein includes hydraulic servos to pivot the trunnions, other mechanisms for adjusting the position of the power rollers 84, such as electrical or mechanical actuators for example, are within the scope of the invention. Further, other gear ratios can be used to define a neutral/balanced position versus a non-balanced position according to a size of the power rollers 84 and/or discs 80, 82.

While not required in all aspects, the de-rotation system 44 selectively engages the shafts 12U, 12L according to an operation of the aircraft. In the shown embodiment, as the upper shaft 12U and the lower shaft 12L rotate about axis A, the sprockets 78 increase in temperature and expand, the sprockets 78 press against the belts 76, causing the de-rotation system 44, and therefore the shaft fairing 42, to rotate about the rotor axis A. Alternately, when the shafts 12U, 12L are not rotating, the sprockets 78 cool causing the de-rotation system 44 to disengage and allowing the shaft fairing 42 to freely rotate. In this manner, the de-rotation system 44 does not interfere with a start-up operation of the aircraft. However, it is understood that other mechanisms can be used to selectively engage the de-rotation system 44, and the de-rotation system 44 could be consistently engaged in other aspects.

Figure 6:
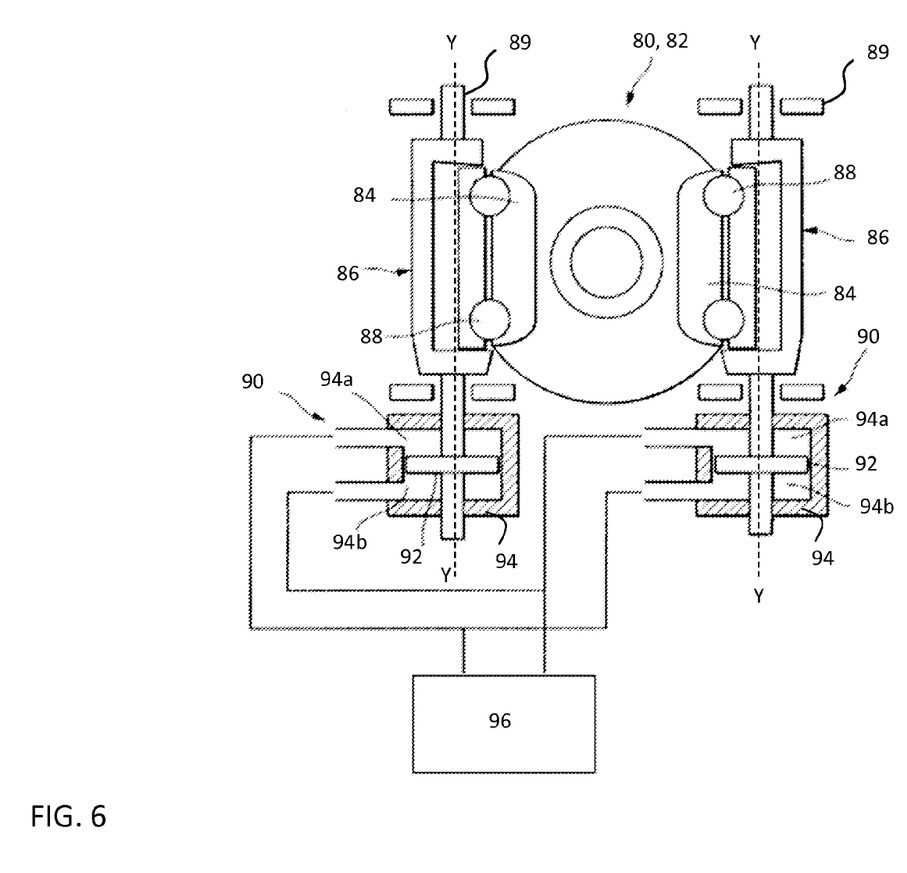
FIG. 6 is a sectional view of the de-rotation system according to an embodiment of the invention.
Figure 7:
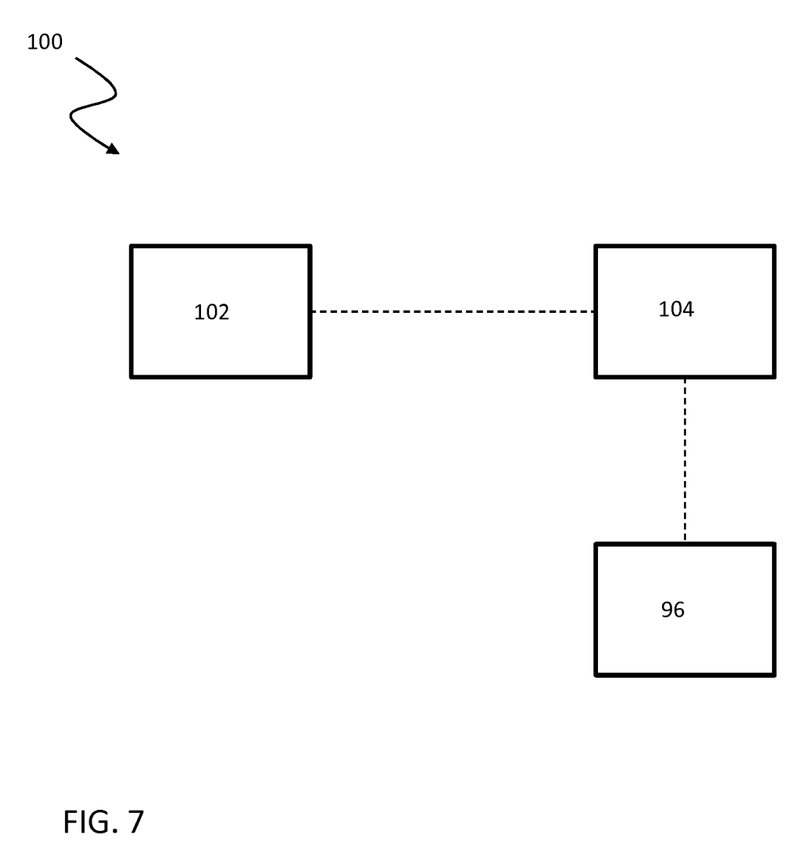
FIG. 7 is a schematic illustration of a control system for monitoring a position of the de-rotation system according to an embodiment of the invention.

Referring now to FIG. 6, the rotary wing aircraft 10 includes a system 100 for controlling the position of the shaft fairing 42. One or more position sensors 102, such as hall effect or magnetic sensors for example, are configured to monitor the position of the shaft fairing 42 and/or the de-rotation system 44. The position sensors 102 may be mounted to the airframe 14 and/or to the shaft fairing of each rotor 38, 40 with triggers mounted to the upper and lower rotor 16, 18 to measure the movement of the de-rotation system 44 relative to the rotor shaft 12. The system additionally includes a controller 104 configured to communicate with the plurality of position sensors 102 as well as the control valve 96 of the de-rotation system 44. The controller 104 may include an algorithm for determining a neutral position of the de-rotation system 44, or alternatively, may have a neutral position stored therein.

The position sensors 102 provide a continuous signal to the controller 104 indicating the position of the de-rotation system 44 relative to the rotor shaft 12. When the position of de-rotation system 44 deviates from the neutral position, the controller 104 will determine the difference between the current position of the de-rotation system 44 and the neutral position. The controller 104 will provide a signal to the control valve 96 indicating a desired orientation and gear ratio of the de-rotation system 44. In response, the control valve 96 will adjust the position of the power rollers 84 relative to the cone discs 80, 82 to achieve the new gear ratio. As a result of the new gear ratio, the de-rotation system 44 will rotate about rotor shaft A, in a direction towards the neutral position. When the position sensors 102 provide a signal to the controller 104 indicating that the de-rotation system 44 is in the neutral position, the controller 104 will communicate with the control valve 96 to adjust the gear ratio of the de-rotation system back to 1:1. In response to the second signal, the control valve 96 will rotate the power rollers 84 back to a balanced position, where the power rollers 84 are substantially coplanar.

Inclusion of a toroidal CVT as a de-rotation system 44 in a rotary wing aircraft 10 offers an infinite variety of gear ratios between the upper rotor shaft 12U and the lower rotor shaft 12L. The CVT enables the rotation of the shaft fairing 42 to be controlled with a high degree of accuracy with a minimal demand for extra power. As such, the shaft fairing 42 can be rotated according to the heading or the aircraft as well as at an angle to the heading according to the input provided to the controller 104, such as where a headwind is at an angle to the heading.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A fairing system for a rotary wing aircraft comprising:
 a shaft fairing mounted for rotation about a first axis of rotation;
 a de-rotation system contained within the shaft fairing, the de-rotation system including a toroidal continuously variable transmission (CVT) configured to control the rotation of the shaft fairing about the first axis of rotation; and
 a position control system including at least one position sensor configured to monitor a position of the shaft fairing relative to the first axis of rotation and a controller operably coupled to the at least one position sensor and to the de-rotation system, the controller being configured to adjust a gear ratio of the toroidal CVT in response to a sensed position of the shaft fairing.
2. The fairing system according to claim 1, wherein the de-rotation system further comprises:
 a cage configured to mount to a shaft via one or more bearings, the cage being configured to attached to the shaft fairing;
 a first platform and a second platform spaced apart by a distance and extending generally outwardly form a surface of the cage;

a first opening formed in the cage generally adjacent the first platform; and
a second opening formed in the cage generally adjacent the second platform, wherein the toroidal CVT is mounted to the first platform and the second platform.

3. The fairing system according to claim 2, the toroidal CVT further comprising:
an upper drive system mounted to the first platform including a first drive pulley, at least one first idler pulley, and a first belt arranged in a continuous loop about the first drive pulley and at least one first idler pulley, wherein a portion of the first belt is arranged within the first opening and is configured to contact an adjacent first sprocket rotating in a first direction;
a lower drive system mounted to the second platform including a second drive pulley, at least one second idler pulley, and a second belt arranged in a continuous loop about the second drive pulley and at least one second idler pulley, wherein a portion of the second belt is arranged within the second opening and is configured to contact an adjacent second sprocket rotating in a second direction;
an upper cone disc operably coupled to the first drive pulley;
a lower cone disc operably coupled to the second drive pulley, the upper cone disc and the lower cone disc being arranged about a common second axis of rotation;
a pair of power rollers arranged on opposing sides of and in contact with the upper cone disc and the lower cone disc, the power rollers are configured to rotate between a balanced position and a rotated position to alter a gear ratio between the upper cone disc and the lower cone disc; and
at least one actuator operably coupled to each of the power rollers to adjust the position of the power rollers.

4. The fairing system according to claim 3, wherein when the power rollers are arranged in the balanced position, the gear ratio of the toroidal CVT is 1:1.

5. The fairing system according to claim 4, wherein when the gear ratio of the toroidal CVT is 1:1, the de-rotation system does not rotate the shaft fairing relative to the first axis of rotation.

6. The fairing system according to claim 3, wherein when the power rollers are arranged in a rotated position, the de-rotation system is configured to rotate about the first axis of rotation.

7. The fairing system according to claim 3, wherein the controller is configured to activate the at least one actuator to adjust the gear ratio of the power rollers.

8. A rotary wing aircraft comprising:
a lower rotor system including a lower shaft connected to a lower rotor hub;
an upper rotor system include an upper shaft connected to an upper hub, the lower shaft being configured to rotate about a first axis of rotation in a first direction and the upper shaft being configured to rotate about the first axis of rotation in a second direction;
a shaft fairing mounted between the lower rotor hub and the upper rotor hub for rotation about the first axis of rotation;
a de-rotation system contained within the shaft fairing, the de-rotation system including a toroidal continuously variable transmission (CVT) configured to control the rotation of the shaft fairing about the first axis of rotation; and
a position control system including at least one position sensor configured to monitor a position of the shaft fairing relative to the first axis of rotation and a controller operably coupled to the at least one position sensor and to the de-rotation system, the controller being configured to adjust a gear ratio of the toroidal CVT in response to a sensed position of the shaft fairing.

9. The rotary wing aircraft according to claim 8, wherein the de-rotation system further comprises:
a cage configured to mount to one of the upper and lower shafts;
a first platform and a second platform spaced apart by a distance and extending generally outwardly form a surface of the cage;
a first opening formed in the cage between the first platform and a first end of the cage and exposing one of the upper and lower shafts; and
a second opening formed in the cage between the second platform and a second end, opposite the first end, of the cage and exposing the other one of the upper and lower shafts, wherein the toroidal CVT is mounted to the first platform and the second platform.

10. The rotary wing aircraft according to claim 9, further comprising a first sprocket coupled to the upper rotor shaft and a second sprocket connected to the lower rotor shaft.

11. The rotary wing aircraft according to claim 10, the toroidal CVT further comprising:
an upper drive system mounted to the first platform including a first drive pulley, at least one first idler pulley, and a first belt arranged in a continuous loop about the first drive pulley and at least one first idler pulley, wherein a portion of the first belt is arranged within the first opening is configured to engage the first sprocket;
a lower drive system mounted to the second platform including a second drive pulley, at least one second idler pulley, and a second belt arranged in a continuous loop about the second drive pulley and at least one second idler pulley, wherein a portion of the second belt is arranged within the second opening and is configured to engage the second sprocket;
an upper cone disc operably coupled to the first drive pulley;
a lower cone disc operably coupled to the second drive pulley, the upper cone disc and the lower cone disc being arranged about a common second axis of rotation;
a pair of power rollers arranged on opposing sides of and in contact with the upper cone disc and lower cone disc, the power rollers are configured to rotate between a balanced position and a rotated position to alter a gear ratio between the upper cone disc and the lower cone disc; and
at least one actuator operably coupled to each of the power rollers to adjust the position of the power rollers.

12. The rotary wing aircraft according to claim 11, wherein when the power rollers are arranged in the balanced position, the gear ratio of the toroidal CVT is 1:1.

13. The rotary wing aircraft according to claim 12, wherein when the gear ratio of the toroidal CVT is 1:1, the de-rotation system does not rotate the shaft fairing relative to the first axis of rotation.

14. The rotary wing aircraft according to claim 11, wherein when the power rollers are arranged in a rotated position, the de-rotation system is configured to rotate about the first axis of rotation.

15. The rotary wing aircraft according to claim 11, wherein the controller is configured to activate the at least one actuator to adjust the gear ratio of the power rollers.

16. A method of controlling rotation of a shaft fairing about a first axis of rotation comprising:
- monitoring a position of the shaft fairing;
- comparing the position of the shaft fairing to a desired position;
- adjusting a gear ratio of a de-rotation system including a toroidal continuously variable transmission if the position of the shaft fairing is different from the desired position;
- rotating the shaft fairing towards the desired position using the de-rotation system having the adjusted gear ratio; and
- adjusting the gear ratio of the de-rotation system to be in a balanced position once the shaft fairing reaches the desired position to stop the rotation of the shaft fairing at the desired position.

17. The method according to claim 16, wherein the position of the shaft fairing is monitored using at least one position sensor operably coupled to a controller.

18. The method according to claim 17, wherein the controller is operably coupled to at least one actuator of the de-rotation system, the controller being configured to operate the actuator to adjust the gear ratio.

19. The method according to claim 16, wherein once the shaft fairing reaches the desired position, the gear ratio is adjusted to 1:1.

\* \* \* \* \*